Patented Oct. 14, 1941

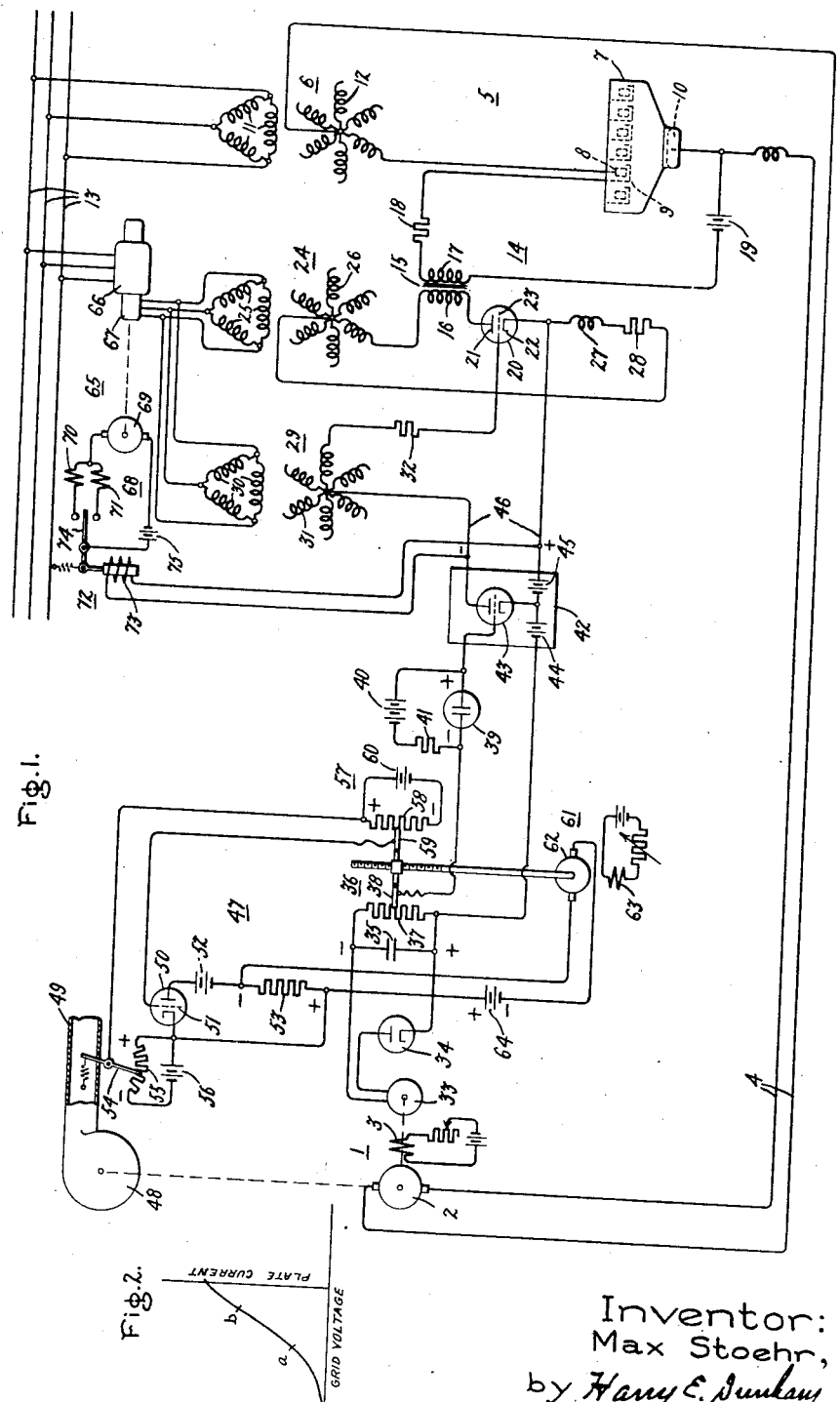

2,259,119

UNITED STATES PATENT OFFICE 2,259,119

ELECTRIC VALVE CONTROL SYSTEM

Max Stoehr, Berlin-Hermsdorf, Germany, assignor to General Electric Company, a corporation of New York Application November 22, 1938, Serial No. 241,827
In Germany December 18, 1937

15 Claims. (Cl. 172—239)

My invention relates to electric valve control systems and more particularly to electric valve systems for controlling dynamo-electric machines.

Heretofore, electric valve apparatus has been employed for controlling an operating condition, such as the speed, of dynamo-electric machines. For example, electric valve translating apparatus has been employed to control the speed of dynamo-electric machines of the direct current type. In some applications, the electric valve apparatus is employed to supply direct current to direct current motors from an associated alternating current supply circuit, and the magnitude of the direct current voltage is varied to maintain the speed at a substantially constant value. In accordance with the teachings of my invention described hereinafter, I provide a new and improved electric valve control system for dynamo-electric machines in which the speed of a dynamo-electric machine may be maintained at any one of a number of predetermined different values, and in which the value of the speed which is maintained is set or established by a second controlling influence.

It is an object of my invention to provide a new and improved electric valve translating circuit.

It is another object of my invention to provide a new and improved control system for electric valve converting apparatus.

It is a further object of my invention to provide a new and improved electric valve control system for dynamo-electric machines.

It is a still further object of my invention to provide a new and improved electric valve control system for controlling the speed of a direct current motor.

In accordance with the illustrated embodiment of my invention, I provide an electric valve translating circuit for controlling the speed of a dynamo-electric machine, such as a direct current motor, which is energized from an associated alternating current supply circuit. The electric valve apparatus is of the type having a control member on which there is impressed a periodic voltage of variable phase to control the value of voltage impressed on the armature of the direct current motor, and hence to effect control of the speed of the motor. I provide a control or excitation circuit which supplies the periodic voltage and which includes a control electric valve of the controlled type having a grid. A variable unidirectional voltage is impressed on the grid to control the time at which the control electric valve is rendered conductive and also to control the time at which the main associated electric valve is rendered conductive during the cycle of alternating voltage supplied by the associated alternating current supply circuit. A pilot generator which is mechanically coupled to the direct current motor produces a voltage, the frequency of which varies as the speed of the direct current motor, and a rectifier energized by the pilot generator produces a unidirectional voltage which varies in response to the speed of the direct current motor and the frequency of the pilot generator. A voltage divider is connected to be energized from the rectifier and is arranged to have a movable contact to control the component of the unidirectional voltage which is impressed on the grid of the control valve to maintain the speed of the direct current motor at any one of a number of different predetermined speeds. The movable contact is positioned in response to a predetermined controlling influence to set or establish the speed of the direct current motor which is to be maintained.

In accordance with another feature of the illustrated embodiment of my invention, I provide a suitable amplifier, such as an electric valve amplifier, for accentuating the variations of the unidirectional voltage derived from the voltage divider and which is connected between the voltage divider and the control electric valve. The resultant voltage impressed on the grid of the control electric valve comprises the unidirectional voltage and an alternating component of voltage. I provide means responsive to the magnitude of the unidirectional voltage for adjusting the alternating component of voltage impressed on the control grid concurrently with the regulatory action of the unidirectional voltage, but at a rate slower than the rate of change of said unidirectional voltage, to permit the regulatory action for the system to take place smoothly and with precision. In this manner, by maintaining the unidirectional voltage within a predetermined range of values by shifting the alternating component of grid voltage, I provide an arrangement for maintaining the operation of the electric valve amplifier within a predetermined region of its output characteristic. By so limiting the range of variation of the unidirectional voltage, a high degree of accuracy of the electric valve amplifier is maintained.

For a better understanding of my invention, reference may be had to the following description taken in connection with the accompanying drawing, and its scope will be pointed out in the appended claims. Fig. 1 diagrammatically illustrates an embodiment of my invention as applied to an electric valve system for controlling the speed of the direct current motor, and Fig. 2 diagrammatically illustrates an operating characteristic of the electric valve amplifier employed in the system.

In Fig. 1 of the accompanying drawing, my invention is diagrammatically illustrated as applied to an electric valve translating system for controlling an operating condition, such as the speed, of a dynamo-electric machine. The dynamo-electric machine may be a direct current motor 1 having an armature member 2 and a field winding 3. The armature member 2 is energized from a direct current circuit 4 by means of an electric valve translating circuit 5 comprising a transformer 6 and an electric valve means 7 having a plurality of anodes 8, a plurality of associated control members 9 and a cathode 10. Transformer 6 is provided with primary windings 11 and a plurality of secondary windings 12 which may be connected to the associated anodes 8 of electric valve means 7. For the purpose of simplifying the presentation of my invention, only one of the secondary windings 12 has been shown as being connected to the associated anode. The electric valve translating apparatus 5 is connected to be energized from an alternating current circuit 13.

I provide a control or excitation circuit 14 which impresses on the control member 9 a periodic voltage of variable phase displacement with respect to the anode-cathode voltage of the associated arc discharge path of the electric valve means 7. It is to be understood that I employ a plurality of excitation circuits such as circuit 14, each associated with a different one of the control members 9. Each of the excitation circuits 14 comprises a transformer 15 having a primary winding 16 and a secondary winding 17. The secondary winding 17 is connected between the cathode 10 and the associated control member 9 through a current limiting resistance 17 and a suitable source of negative unidirectional biasing potential such as a battery 19.

To effect energization of the control members 9 at the desired instant during the cycles of the anode-cathode voltages of the associated arc discharge paths, I provide a control electric valve 20 which may be of the type employing an ionizable medium and which comprises an anode 21, a cathode 22 and a grid 23. The anode-cathode circuit of the electric valve 20 may be energized from a suitable transformer 24 having primary windings 25 and a plurality of secondary windings 26. An inductance 27 and a resistance 28 may be connected in series relation with the electric valve 20 in order to render the electric valve 20 non-conductive after the transmission of an impulse of current through the primary winding 16 of transformer 15.

There is impressed on the grid 23 of electric valve 20 an alternating component of voltage which may be obtained by means of a transformer 29 having primary windings 30 and a plurality of secondary windings 31. A current limiting resistance 32 may be connected in series relation with the associated secondary winding 31 and the grid 23.

As a means for impressing on the grid 23 a unidirectional voltage the magnitude of which varies in accordance with an electrical condition, or an operating condition such as the speed of the direct current motor 1, I employ a pilot generator 33 which may be mechanically coupled to the direct current motor 1, and which may produce an alternating voltage the frequency of which varies in response to the speed of motor 1. I employ a rectifier 34 to produce a unidirectional voltage which varies in accordance with the speed of motor 1, and the unidirectional voltage is impressed across the terminals of parallel connected capacitance 35 and a voltage divider 36. The voltage divider 36 may comprise a resistance 37 and an adjustable or movable contact 38. The position of the contact 38 along the resistance 37 determines the magnitude of the unidirectional voltage impressed on the grid 23. As a standard or reference voltage against which the variable unidirectional component of voltage acts, I employ any suitable arrangement, such as a glow discharge valve 39, which may be energized from a suitable source of unidirectional current such as a battery 40 and through a current limiting resistance 41.

A suitable electric valve amplifier 42 is employed to accentuate the variations in the unidirectional voltage derived from the voltage divider 36. The electric valve amplifier 42 comprises an electric valve 43, a source of negative grid voltage such as a battery 44, and a suitable plate supply such as a battery 45. Output circuit 46 of the electric valve amplifier 42 is connected to the grid 23 of the control electric valve 20 through the secondary winding 31 of transformer 29 and resistance 32.

I provide a circuit 47 which sets or establishes the value of speed which is maintained by the control system. Circuit 47 may be responsive to a predetermined controlling influence such as the dynamic pressure of a fluid impelled by a centrifugal blower 48 which may be driven by the direct current motor 1. For example, the circuit 47 may be responsive to the dynamic pressure of the fluid in conduit 49. Circuit 47 comprises an electronic discharge device 50 which is of the high-vacuum type having a grid 51, a source of current such as a battery 52, and a suitable impedance element such as a resistance 53. As a means for controlling the resultant voltage impressed on the grid 51, I provide a suitable pressure responsive arrangement diagrammatically illustrated as comprising a vane or armature 54, a voltage divider 55 and a source of current such as a battery 56 which energizes the resistance 55. As a means for controlling the conductivity of the electronic discharge device 50 when the movable contact 38 of the voltage divider 36 is moved to the position which restores the dynamic pressure in conduit 49 to the desired value, I provide a voltage divider 57 comprising a resistance 58, a movable contact 59, and a source of current such as a battery 60.

To position the movable contacts 38 and 59, I employ any suitable arrangement, such as a direct current motor 61 having an armature 62 and a field winding 63. The amount and direction of current transmitted to the armature 62 is controlled by the magnitude and the polarity of the resultant voltage appearing across the terminals of the resistance 53. The voltage appearing across the terminals of the resistance 53 is balanced against a suitable reference voltage, such as the voltage of battery 64, to control the magnitude and direction of the resultant voltage impressed on the armature 62 of motor 61.

In order to permit the electric valve amplifier to operate within the most desirable region of its output characteristic, I provide a circuit 65 which controls the phase of the periodic voltage impressed on the control members 9 of electric valve means 7, concurrently with the variation in the magnitude of the unidirectional voltage, but at a rate slower than the rate of change of the unidirectional voltage. Circuit 65 controls the phase of the periodic grid voltages relative to the anode-cathode voltages of the electric valve means 7 in response to the magnitude of the output voltage of the electric valve amplifier 42. Circuit 65 may comprise any suitable phase shifting arrangement, such as a rotary phase shifter 66, which controls the phase of the voltages impressed on transformers 24 and 29. A rotating member 67 of the phase shifter 66 may be positioned by any suitable arrangement such as a reversible motor 68 comprising an armature 69 and a pair of field windings 70 and 71. Selective energization of the field windings 70 and 71 may be attained by means of a suitable relay 72 having an actuating coil 73 and a spring biased armature member 74. Circuit 65 is responsive to the unidirectional grid voltage and the actuating coil 73 of relay 72 may be connected across the output circuit 46 of the electric valve amplifier 42. A battery 75 may be employed to energize the reversible motor 68.

The operation of the embodiment of my invention diagrammatically illustrated in Fig. 1 will be considered when the system is operating to maintain the pressure of the fluid in conduit 49 at a predetermined value. Direct current is transmitted to the armature member 2 of the direct current motor 1 through transformer 6 and electric valve means 7. The speed of the machine 1 is controlled by varying the magnitude of the voltage of the direct current circuit 4. The manner in which the voltage of circuit 4 is controlled by the electric valve means 7 is well understood by those skilled in the art. Briefly stated, the average direct current voltage of circuit 4 is maximum when there is substantial phase coincidence between the anode-cathode voltages and the voltages impressed on the control members 9, and the direct current voltage of circuit 4 is decreased as the periodic control member voltages are displaced in phase in a lagging direction with respect to the associated anode voltages.

Excitation circuit 14 impresses impulses of voltage on control members 9. Control electric valve 20 is rendered conductive at predetermined different times during cycles of voltage of circuit 13 to control the magnitude of the unidirectional voltage of circuit 4.

Pilot generator 33 and the rectifier 34 produce across the terminals of resistance 37 a unidirectional voltage the magnitude of which varies as the speed of the direct current motor 1. Predetermined components of this voltage are impressed on the input circuit of the electric valve amplifier 42, and the amplified voltage of circuit 46 is impressed on grid 23 of the controlled electric valve 20 to control the time during the cycles of alternating voltage of circuit 13 at which the electric valve 20 is rendered conductive. Furthermore, the magnitude of the unidirectional voltage of circuit 46 controls the phase of the periodic voltages impressed on the control members 9 through the intervening operations of circuit 14.

Circuit 47 is adjusted so that the voltage appearing across the terminals of resistance 53 is exactly equal to and in opposition to the voltage produced by the battery 64, so that the armature 62 of motor 61 is deenergized when a predetermined desired value of fluid pressure obtains in the conduit 49. Changes in the dynamic pressure of the fluid in conduit 49 varies the conductivity of the electric discharge device 50 to control the amount of current transmitted through resistance 53 and hence controls the positions of contacts 38 and 59. The position of contact 38 controls the unidirectional voltage impressed on the grid 23 of control electric valve 20 and hence controls the magnitude of the direct current voltage of circuit 4. The speed of the direct current motor 1 is correspondingly changed to control the speed of the centrifugal blower 48 and to bring the dynamic pressure to the desired value.

Considering more particularly the operation of circuit 47, the circuit is adjusted initially so that when a predetermined value of fluid pressure obtains, the voltage appearing across the resistance 53 exactly balances the voltage of battery 64. When this obtains, the armature 62 of motor 61 is deenergized and the contacts 38 and 59 are at rest. If it be assumed that the dynamic pressure of the fluid in conduit 49 temporarily decreases due to a change in some physical condition such as a change in the temperature of the fluid, the resultant unidirectional voltage impressed on grid 51 of the electronic discharge device 50 will be less negative, effecting the transmission of a larger amount of current through resistance 53 and supplying a current of predetermined polarity to armature 62 of motor 61. For this direction of current transfer, the movable contacts 38 and 39 are moved downwardly, increasing the negative unidirectional voltage supplied by the voltage divider 57 and tending to decrease the current transmitted by the electronic discharge device 50 to that value of current which restores the voltage appearing across resistance 53 to a value which is equal and opposite to the voltage of battery 64. It will thus be understood that the motor 61 is energized until this last mentioned condition prevails. Movement of the contact 38 downwardly decreases the magnitude of the unidirectional voltage and hence decreases the magnitude of voltage of circuit 46. Upon such decrease in magnitude of voltage 46, there is effected a corresponding advancement in phase of the periodic voltages impressed on the control members 9. Consequently, the voltage of circuit 4 is increased tending to increase the speed of the direct current motor 1. Of course, upon increase in speed of the direct current motor 1, the fluid pressure in conduit 49 will be increased. Conversely, if the fluid pressure within the conduit 49 temporarily increases, the conductivity of the electronic discharge device 50 will be decreased, causing the voltage appearing across the terminals of resistance 53 to decrease to a value less than the voltage of battery 64. The current through the armature 62 of motor 61 is now in a direction tending to move the contacts 38 and 59 upwardly to a new position at which the voltage appearing across the terminals of resistance 53 exactly balances the voltage of battery 64. When the contact 38 is moved upwardly, the unidirectional voltage of circuit 46 increases in magnitude causing the control electric valve 20 to be rendered conductive at later times during the cycles of voltage of circuit 13. Accordingly, the voltage of circuit 4 is decreased, effecting a reduction in speed of the direct current motor 1 and tending to restore the fluid pressure in conduit 49 to the desired value.

Circuit 65 operates to control the alternating component of voltage supplied by transformer 29 so that the electric valve amplifier 42 may operate within the straight portion a—b of the output characteristic shown in Fig. 2. Obviously, when the electric valve amplifier 42 is operated within that region of its characteristic, its accuracy and precision are maximum. The circuit 65 responds to the magnitude of the unidirection voltage of circuit 46 to control the phase of the voltage impressed on grid 23 and to control the phase of the voltage provided by transformer 24 to maintain the unidirectional voltage within a predetermined range of values. For example, if the unidirectional voltage tends to exceed a predetermined value, the reversible motor 68 is controlled to operate the rotary phase shifter 66 and retards the voltages produced by transformers 24 and 29 relative to the anode-cathode voltage of electric valve means 7. Conversely, if the magnitude of the voltage of circuit 46 decreases to a predetermined minimum value, rotary phase shifter 66 is controlled by the reversible motor 68 to advance the phase of the alternating voltages produced by transformers 24 and 29. Circuit 65 operates concurrently with the voltage divider 36 and circuit 47, but at a substantially slower rate in order that the operation may be effected without sacrificing the precision of control in regulating the speed of the direct current motor 1 and maintaining the fluid pressure in conduit 49. The operation of circuit 65 occurs concurrently with the regulatory action produced by variations in the magnitude of the unidirectional grid voltage, so that the system at all times performs in a smooth and precise manner.

It will be understood that the system responds to maintain any one of a predetermined number of speeds in accordance with the control dictated by circuit 47. That is, if the fluid pressure in the conduit 49 changes, circuit 47 acts through motor 61 to position contact 38 to set or establish the different speed which is to be maintained. Of course, that speed is maintained only so long as the desired fluid pressure is maintained in the conduit 49.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamo-electric machine, an alternating current circuit, electric translating apparatus connected between said alternating current circuit and said machine and comprising electric valve means having a control member for controlling the conductivity thereof, means responsive to an operating condition of said machine for energizing said control member to maintain said operating condition of said machine at any one of a number of predetermined different values, apparatus operated by said machine, and means responsive to a predetermined controlling influence derived from the last mentioned apparatus for controlling said last mentioned means to set the value of said operating condition which is maintained.

2. In combination, a dyanmo-electric machine, an alternating current circuit, electric translating apparatus connected between said alternating current circuit and said machine and comprising an electric valve means having a control member for controlling the conductivity thereof, means for impressing on said control member a voltage which varies in accordance with a predetermined operating condition of said machine to maintain the speed of said machine at any one of a number of predetermined different values apparatus operated by said machine, and means for controlling said last mentioned means in accordance with a predetermined controlling influence derived from the last mentioned apparatus.

3. In combination, an alternating current circuit, a dynamo-electric machine, electric translating apparatus for controlling the energization of said machine and comprising an electric valve means having a control member for controlling the conductivity thereof, means for impressing on said control member a unidirectional voltage which varies in accordance with a predetermined controlling influence derived from said machine, apparatus operated by said machine, and means responsive to a second predetermined controlling influence which varies in accordance with an operating condition of the last mentioned apparatus to control said last mentioned means to maintain said operating condition at any one of a number of predetermined different values.

4. In combination, a dynamo-electric machine, an alternating current circuit, electric translating apparatus connected between said alternating current circuit and said machine and comprising electric valve means having a control member for controlling the conductivity thereof, means for impressing on said control member a unidirectional voltage which varies in accordance with the speed of said machine, apparatus operated by said machine, and means responsive to a predetermined controlling influence derived from the last mentioned apparatus for controlling said last mentioned means to set the speed of said machine.

5. In combination, a dynamo-electric machine, an alternating current circuit, electric translating apparatus connected between said alternating current circuit and said machine and comprising an electric valve means having a control member for controlling the conductivity theerof, means for impressing on said control member a unidirectional voltage which varies in accordance with the speed of said machine and comprising a voltage divider and a movable contact associated with said voltage divider, means for positioning said movable contact, and means responsive to a predetermined controlling influence for controlling said last mentioned means.

6. In combination, a dynamo-electric machine, an alternating current circuit, electric translating apparatus connected between said alternating current circuit and said machine and comprising an electric valve means having a control member for controlling the conductivity thereof, a pilot generator for producing an alternating voltage the frequency of which varies in accordance with the speed of said machine, means for impressing on said control member unidirectional voltage which varies as the speed of said machine and comprising a rectifier energized from said pilot generator and a voltage divider connected to said rectifier, said voltage divider having a movable contact for controlling the magnitude of said unidirectional voltage, means for positioning said movable contact, and means responsive to a predetermined controlling influence for controlling said last mentioned means.

7. In combination, an alternating current circuit, a direct current circuit, electric translating apparatus connected between said circuits and comprising electric valve means having an anode, a cathode and a control member, an excitation circuit including rotary phase shifting means for impressing on said control member a periodic voltage to control an electrical condition of said direct current circuit and comprising means for producing a unidirectional voltage variable to effect control of said electrical condition of said direct current circuit, and positioning means responsive to a predetermined controlling influence for operating said rotary phase shifting device to adjust the phase displacement between said periodic voltage and the anode-cathode voltage of said electric valve means.

8. In combination, an alternating current circuit, a direct current circuit, electric translating apparatus connected between said circuits and comprising electric valve means having an anode, a cathode and a control member, an excitation circuit including a rotary phase shifting device for impressing on said control member a periodic voltage and comprising means for producing a unidirectional voltage which varies in accordance with a predetermined controlling influence, and positioning means responsive to said unidirectional voltage for operating said positioning means to adjust the phase displacement between said periodic voltage and the anode-cathode voltage of said electric valve means.

9. In combination, an alternating current circuit, a direct current circuit, electric translating apparatus connected between said circuits and comprising an electric valve means having an anode, a cathode and a control member, an excitation circuit including a rotary phase shifting device for impressing on said control member a periodic voltage and comprising means for producing a unidirectional voltage which varies in accordance with a predetermined controlling influence and means for amplifying said unidirectional voltage, and positioning means responsive to the magnitude of said unidirectional voltage for operating said phase shifting device to adjust the phase displacement between said periodic voltage and the anode-cathode voltage of said electric valve means.

10. In combination, an alternating current circuit, a direct current circuit, electric translating apparatus connected between said circuits and comprising an electric valve means having an anode, a cathode and a control member, an excitation circuit for impressing on said control member a periodic voltage and comprising means for producing a unidirectional voltage which varies in accordance with a predetermined controlling influence, and means responsive to the magnitude of said unidirectional voltage for adjusting the phase displacement between said periodic voltage and the anode-cathode voltage of said electric valve means but operable at a slower rate than the rate of change of said unidirectional voltage.

11. In combination, an alternating current circuit, a direct current circuit, electric translating apparatus connected between said circuits and comprising an electric valve means having an anode, a cathode and a control member, a control circuit for impressing on said control member a periodic voltage and comprising an electric valve having a grid, an excitation circuit for said last mentioned electric valve and comprising means for impressing on said grid a unidirectional voltage which varies in accordance with a predetermined controlling influence, means for impressing on said grid an alternating voltage, and means responsive to the magnitude of said unidirectional voltage for adjusting the phase of said alternating voltage concurrently with the regulatory action of said unidirectional voltage.

12. In combination, an alternating current circuit, a direct current circuit, electric translating apparatus connected between said circuits and comprising an electric valve means having an anode, a cathode and a control member, a control circuit for impressing on said control member a periodic voltage and comprising an electric valve having a grid, an excitation circuit for said last mentioned electric valve and comprising means for impressing on said grid a unidirectional voltage which varies in accordance with a predetermined controlling influence, means for impressing on said grid an alternating voltage, and means responsive to the magnitude of said unidirectional voltage for adjusting the phase of said alternating voltage concurrently with the regulatory action of said unidirectional voltage to maintain the magnitude of said unidirectional voltage within a predetermined range of values.

13. In combination, an alternating current circuit, a direct current circuit, electric translating apparatus connected between said circuits and comprising an electric valve means having an anode, a cathode and a control member, a control circuit for impressing on said control member a periodic voltage and comprising an electric valve having a grid, an excitation circuit for said last mentioned electric valve and comprising means for impressing on said grid a unidirectional voltage which varies in accordance with a predetermined controlling influence, means for impressing on said grid an alternating voltage, and means responsive to the magnitude of said unidirectional voltage for adjusting the phase of said alternating voltage concurrently with the regulatory action of said unidirectional voltage but at a rate substantially less than the rate of change of said unidirectional voltage.

14. In combination, an alternating current circuit, a direct current circuit, electric translating apparatus connected between said circuits and comprising an electric valve means having an anode, a cathode and a control member, a control circuit for impressing on said control member a periodic voltage and comprising an electric valve having a grid, an excitation circuit for said last mentioned electric valve and comprising means for impressing on said grid a unidirectional voltage which varies in accordance with a predetermined controlling influence, means for impressing on said grid an alternating voltage, means for amplifying said unidirectional voltage, and means responsive to the magnitude of said unidirectional voltage for adjusting the phase of said alternating voltage concurrently with the regulatory action of said unidirectional voltage to permit said amplifier to operate within a predetermined region of its output characteristic.

15. In combination, an alternating current circuit, a direct current circuit, electric translating apparatus connected between said circuits and comprising an electric valve means having an anode, a cathode and a control member, a control circuit for impressing on said control member a periodic voltage and comprising an electric valve having a grid, an excitation circuit for said last mentioned electric valve and comprising means for impressing on said grid a unidirectional voltage which varies in accordance with a predetermined controlling influence, means for impressing on said grid an alternating voltage, means for amplifying said unidirectional voltage, and means responsive to the magnitude of said unidirectional voltage for adjusting the phase of said alternating voltage concurrently with the regulatory action of said unidirectional voltage but at a rate slower than the rate of change of said unidirectional voltage to maintain said unidirectional voltage within a predetermined range of values.

MAX STOEHR.